Sept. 18, 1923.
M. LOUGHEAD
1,468,602
BRAKE OPERATING MECHANISM
Filed July 25, 1922  2 Sheets-Sheet 1
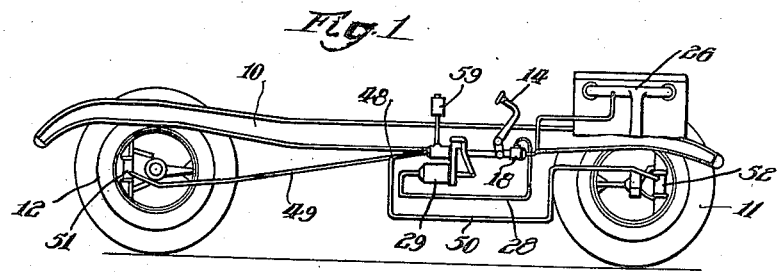
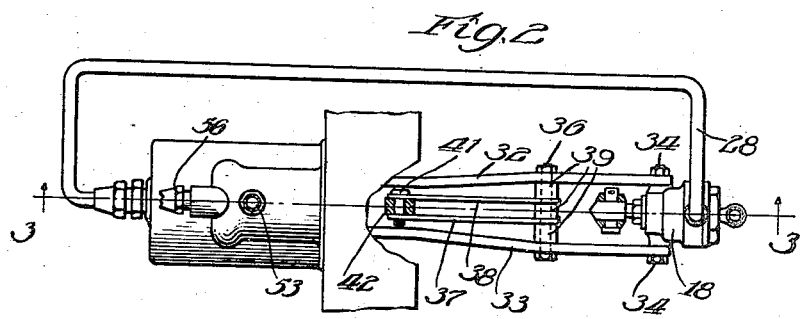
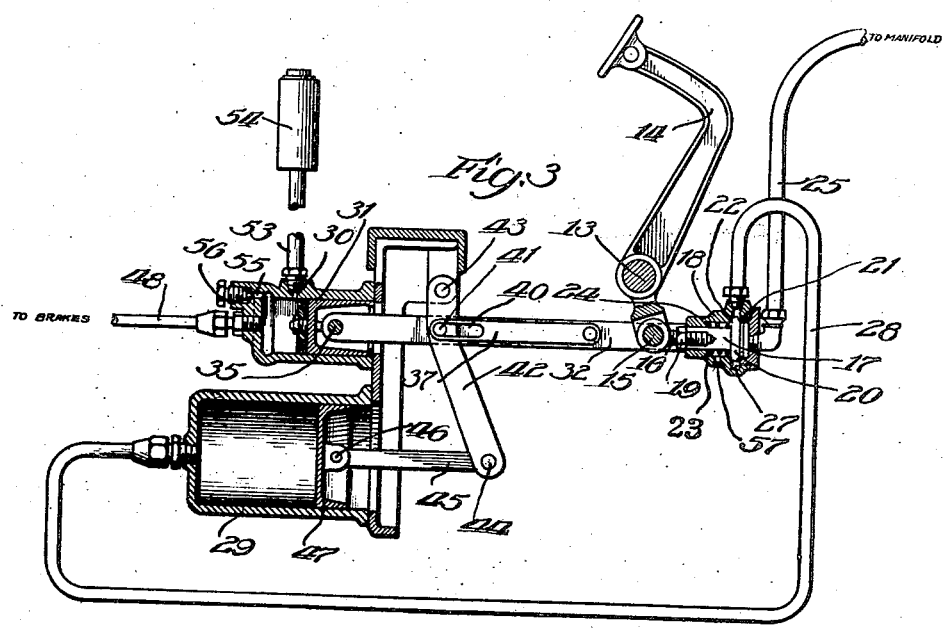

Sept. 18, 1923.
M. LOUGHEAD
BRAKE OPERATING MECHANISM
Filed July 25, 1922
1,468,602
2 Sheets-Sheet 2
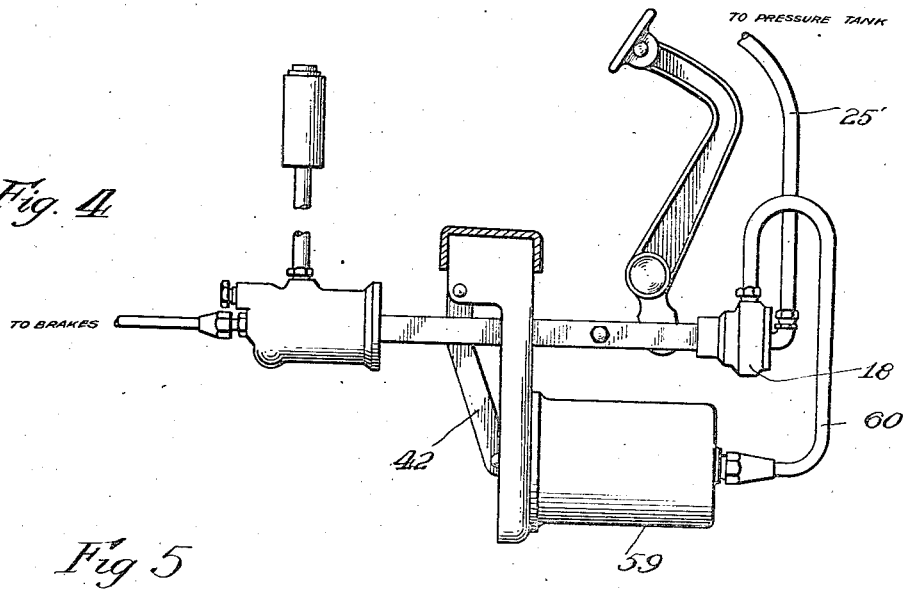
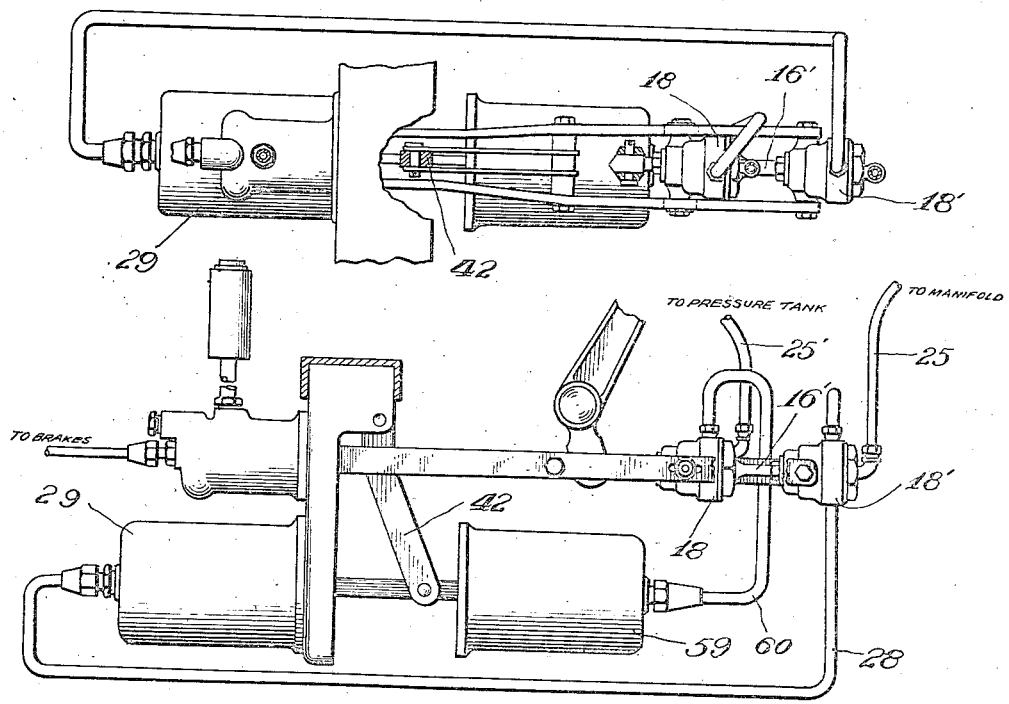

Patented Sept. 18, 1923.

1,468,602

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

BRAKE-OPERATING MECHANISM.

Application filed July 25, 1922. Serial No. 577,322.

*To all whom it may concern:*

Be it known that I, MALCOLM LOUGHEAD, a citizen of the United States, and resident of Detroit, in the county of Wayne and State of Michigan, have invented a certain new and useful Improvement in Brake-Operating Mechanism, of which the following is a full, clear, concise, and exact description, reference being had to the accompanying drawings, forming a part of this specification.

This invention relates to braking mechanism for automobiles or like vehicles, in which the brake is initially actuated by manual means, and in which the manual force is subsequently assisted by extraneous means as a pneumatically operated device.

In applicant's previous application, Serial No. 531,144, filed January 23, 1922, a braking mechanism of the general character of that above set forth is disclosed. The present invention is distinguished from that shown in applicant's prior filed application by the provision of a power multiplying lever between the assisting means and the brake operating mechanism.

The principal feature of the present invention resides in the lever arrangement by which, as the brake operating mechanism approaches its fully operated position, the leverage of the assisting device on the operating mechanism increases.

Other features and advantages will appear from time to time as the description of the invention progresses.

It is believed the invention will be best understood from a detailed description thereof taken in connection with the accompanying drawings, in which—

Figure 1 is a side elevation of the automobile chassis, with applicant's braking mechanism thereon;

Figure 2 is a plan view with parts broken away, and shows applicant's brake operating mechanism in detail;

Figure 3 is a sectional view on the line 3—3 of Figure 2 looking in the direction of the arrows, and more particularly it discloses the lever arrangement and connections joining the pneumatically actuated assisting device to the brake operating mechanism.

Figure 4 shows a modification in which compressed air is used;

Figure 5 is a plan view of still another modification in which both suction and compressed air are employed, and Figure 6 is a side view of the form shown in Figure 5.

Referring now to the drawings, in which like reference characters indicate like parts in the several views, 10 indicates the sill of the automobile supported on the front wheels 11 and the rear wheels 12. The wheels 11 and 12 are shown as provided with braking mechanism such as disclosed in applicant's application, Serial No. 531,145, filed January 23, 1922, although any other fluid operated braking mechanism or mechanically operated braking mechanism may be employed with applicant's invention.

Pivotally supported on the automobile chassis by means of the pivot pin 13 is the foot operated brake lever 14. Pivotally connected to the brake lever 14 by means of the pivot pin 15 is a member 16 which is screw threaded into the valve stem 17 slidably mounted within the housing 18. A lock nut 19 is provided to maintain the member 16 and valve stem 17 in adjusted relation. The valve stem 17 is provided at its upper end with a double faced valve member 20 arranged to co-operate when in normal position with the valve seat 21 in the housing, and, when in its alternate position, with the valve seat 22.

A spiral compression spring 23 is arranged wthin the housing 18 and about the valve stem 17, one end being in engagement with the valve member 20, the other with the shoulder 24 in the housing 18. The spring 23 acts to normally maintain the valve member 20 in operative engagement with the valve seat 21.

Communicating with the housing 18 in front of the valve member 20 is one end of a flexible tube 25, the other end of which communicates with the intake manifold 26 of the engine. Provided in the housing 18 about the valve member 20 is an annular groove 27, and communicating with the groove 27 is one end of the flexible tube 28, the opposite end of which communicates with the closed end of the cylinder 29.

Positioned substantially in alignment with the reciprocating valve stem 17 is a cylinder 30 provided with the reciprocating piston 31. The bars 32 and 33 each has one end rigidly connected to the housing member 18 by means of a cap screw 34, the other end being pivotally joined to the piston 31 by means of the pivot pin 35. Pivotally supported on the bolt 36 extending through the bars 32 and 33 is a pair of links 37 and 38, spacing members 39 being provided to maintain the parts in proper relation. The links 37 and 38 are each provided at its end remote from the bolt 36 with a slot 40. A bolt or pin 41 passes through the slots 40 and also through an opening in the lever 42. One end of the lever 42 is pivotally supported on the pivot pin 43 fixed to the machine framework, the other end being pivotally joined by means of the bolt 44 to the piston rod 45. The rod 45 at its end remote from the lever 42 is pivotally joined by means of the pivot pin 46 to the piston 47 slidably mounted within the cylinder 29.

Communicating with the end of the cylinder 30 is one end of a tube 48 which in turn communicates with the tubes 49 and 50, extending to the brake operating cylinders 51 and 52. Communicating with the cylinder 30, at a point immediately adjacent to the forward face of the piston 31 when in its retracted position, is a tube 53, the opposite end of which communicates with a filler tank of any desired character, such as indicated at 54. The cylinder 30 is also provided with an opening 55 through which air may escape from the braking system when it is initially filled with the braking fluid. The opening 55 is normally closed by means of the screw member 56.

Assuming now that pressure is exerted on the brake operating lever 14, causing the upper end thereof to move to the right, as viewed in Figure 3, the valve stem 17 will be drawn to the left against the tension of the spring 23, causing the valve member 20 to move off from the seat 21 and onto seat 22 closing port 57 and operatively joining the tube 25 to the tube 28. As the tube 25 is joined to the intake manifold 26 of the engine, if the engine is running a partial vacuum will be created in the cylinder 29, thus operating to draw the piston member 47 to the left. As soon as the valve member 20 engages the seat 22, further movement of the valve stem 17 in relation to the housing 18 is prevented, and the housing member is caused to move to the left along with the valve stem 17. As the bars 32 and 33 are joined to the housing member, they likewise are moved to the left, carrying with them the piston 31 within the cylinder 30. It is to be understood that the closed space within the cylinder 30, and likewise the tubes extending therefrom to the brake cylinders, are all completely filled with an appropriate brake operating fluid. Therefore, as the piston 31 moves to the left, in Figure 3, the brake operating fluid will be forced out of the cylinder 30 and through the tubes 48, 49 and 50 to the brake operating cylinders 51 and 52.

This movement of the piston 31 to the left is associated by the movement of the piston 47 within the cylinder 29. As the piston 47 moves to the left as a result of being joined to the intake manifold 26 through tubes 28 and 25, the pin 41 in the bell crank lever 42 engages the ends of the slots 40, thus assisting in the movement of the piston 31 in an obvious manner.

It should be noted that as long as the engine continues to run and the valve member 20 is maintained in engagement with the valve seat 22, the piston 47 will be drawn to the left, thus helping to maintain the brakes in operative condition. As soon, however, as pressure is removed from the lever 14, the spring 23 acts to return the valve member 20 to its normal position in engagement with the seat 21, thus interrupting the passage between tubes 25 and 28, and permitting atmospheric pressure to be established within the cylinder 29 and tube 28 due to the fact that tube 28 is now in communication with the air vent passage 57. As pressure is now no longer maintained on the piston 31, the braking fluid is forced out of the braking cylinders 51 and 52 through the tube 48 into the cylinder 40, releasing the brakes and restoring the parts to normal position. Thus, it is evident that the penumatic pressure exerted on the piston 47 will assist the manually operated means in setting the brakes. This means also may be used to maintain the brakes in operative position.

From an inspection of Figure 3 of the drawings, it will be noted that the weight arm of the bell crank lever 42, when in normal position, extends at substantially right angles to the bars 32 and 33, and to the axis of the cylinder 29, and that the power arm of the bell crank lever extends at an oblique angle to the axis of the cylinder 29 and also to the draw bars. However, when the piston 47 moves to the left, as seen in Figure 3, as the brakes approach their fully operative position, the power arm of the bell crank will approach a position where it is at right angles to the axis of the cylinder and the bars 32 and 33. At the same time the weight arm of the lever 42 approaches a position where it extends at an acute angle to the axis of the cylinder 29 and to the bars 32 and 33. Thus, as the pistons 31 and 47 move to the left, the effective length of the weight arm of the bell crank decreases while the effective length of the power arm increases. Without further description, it will be obvious that the force which the piston 47 exerts on the brake operating bars 32 and 33 increases very rapidly as the brakes approach their fully operative position. This is a very desirable arrangement, for as the initial movement of the brakes is brought about by a relatively light force, a force materially greater is required to finally move the brakes into fully operative position.

While in Fig. 3, the assisting means has been shown as of the vacuum operated type, it is quite obvious that the assisting means may be fluid pressure operated instead of being operated by suction. In Figure 4 is indicated the modification necessary to employ a fluid pressure operated means instead of the suction operated means. In this modification, the cylinder 59 is connected through the tube 60 and the valve arrangement 20 and 21 and a tube 25' to a source of air under pressure, as a compressed air cylinder. The cylinder 59 is provided with a piston which is joined in a well known manner to the bell crank lever 42 by means of a piston rod. The substitution of the cylinder 59 joined to the pressure tank for the cylinder 29 is the only modification necessary in the mechanical structure in order to employ a fluid pressure operated assisting means instead of the vacuum operated assisting means. In certain structures, it may be found desirable to use both the fluid operated and suction operated means in combination, in which case two valves will be provided, each being individual to its own specific assisting means.

In Figures 5 and 6 of the drawings a structure is illustrated employing both the suction operated and pressure operated means. This structure will combine the arrangement of Figure 3 with that shown in Figure 4. As one of these cylinders is joined to the manifold and the other to a pressure tank, it is necessary to provide two valves, the housings of which are indicated as 18 and 18'. These valves will be structurally the same as the one shown in Figure 3. However, in order that the valve within the housing 18' may be actuated, its stem 16' is joined to the housing 18. Thus, it will be obvious that upon actuation of the foot lever, the valve within the housing 18 will first be actuated, and upon moving out of the housing 18, the valve within the housing 18' will be actuated.

Although in the above description, and in the drawings, certain specific details have been disclosed, it is to be understood that applicant contemplates further modifications of his invention, and it is to be understood, therefore, that the invention is to be limited merely by the scope of the appended claims.

Having thus described my invention, what I claim is:

1. In a brake operating apparatus, manually actuated means for operating the brakes, external means for assisting in the operation of the brakes rendered operative by the initial operation of said manually actuated means, and a bell crank lever joining said external means to said manually actuated means, said lever being arranged with its weight arm normally substantially at right angles and its power arm at an acute angle to the axis of movement of said external means, and with its power arm at substantially a right angle, and its weight arm at an acute angle to said axis of movement of said external means when said external means is in its fully actuated position.

2. In a brake operating mechanism, manually actuated means for operating the brakes, pneumatically actuated means including a cylinder and a piston therein for assisting in the operation of the brakes rendered operative by the initial operation of said manually actuated means, and a bell crank lever joining said piston to said manually actuated means, said lever being arranged with its weight arm normally substantially at right angles and its power arm at an acute angle to the axis of movement of said piston, and with its power arm at substantially a right angle and its weight arm at an acute angle to said axis when said piston is in its fully actuated position.

3. In a brake operating mechanism, manually actuated means for operating the brakes, pneumatically actuated means rendered operative by the initial operation of said manually actuated means for assisting in the operation of the brakes, and a bell crank lever joining said pneumatically actuated means to said manually actuated means, said lever being arranged with its weight arm normally substantially at right angles and its power arm at an acute angle to the axis of movement of said pneumatically actuated means, and with its power arm at substantially a right angle and its weight arm at an acute angle to said axis when said pneumatically actuated means is in its fully actuated position.

4. In a braking apparatus, means for operating the brakes, manually actuated means for operating the brake operating means, pneumatically actuated means rendered operative by the initial operation of said manually actuated means for assisting in the operation of the brakes, and a lever mechanism joining said pneumatically actuated means to said brake operating means, said mechanism being so arranged that the force exerted on said brake operating means increases as the brakes approach their fully operated position.

5. In a braking apparatus, means for operating the brakes, manually actuated means for operating said braking means, pneumatically actuated means rendered oper- ative by the initial operation of said manually actuated means for assisting in the operation of the brakes, and a lever joining said pneumatically actuated means to said brake operating means, said lever being so arranged that the relative length of its weight arm to its power arm decreases as the brakes approach their normal position.

6. In a braking apparatus, means for operating the brakes, manually actuated means for operating said brake operating means, pneumatically actuated means rendered operative by the initial operation of said manually actuated means for assisting in the operation of the brakes, and a bell crank lever joining said pneumatically actuated means to said brake operating means.

7. In a breaking apparatus, means for operating the brakes, manually actuated means for operating said brake operating means, pneumatically actuated means rendered operative by the initial operation of said manually actuated means for assisting in the operation of the brakes, and a bell crank lever joining said pneumatically actuated means to said brake operating means, said lever being arranged with its weight arm normally substatially at right angles and its power arm at an acute angle to the axis of movement of said pneumatically actuated means, and with its power arm at substantially a right angle and its weight arm at an acute angle to said axis when said pneumatically actuated means is in its fully operated position.

8. In a breaking apparatus, fluid pressure means for operating the brakes, manually actuated means for operating said fluid pressure means, pneumatically actuated means rendered operative by the initial operation of said manually actuated means for assisting in the operation of the brakes, and power multiplying means joining said pneumatically actuated means to said fluid pressure means.

9. In a breaking apparatus, fluid pressure means for operating the brakes, pneumatically actuated means rendered operative by the initial operation of said manually actuated means for assisting in the operation of the brakes, and a lever mechanism joining said pneumatically actuated means to said fluid pressure means, said mechanism being so arranged that the force exerted on said fluid pressure means increases as the brakes approach their fully operated position.

10. In a braking apparatus, fluid pressure means for operating the brakes, manually actuated means for operating said fluid pressure means, pneumatically actuated means rendered operative by the initial operation of said manually actuated means for assisting in the operation of the brakes, and a lever joining said pneumatically actuated means to said fluid pressure means, said lever being so arranged that the relative length of its weight arm to its power arm decreases as the brakes approach their normal position.

11. In a braking apparatus, fluid pressure means for operating the brakes, manually actuated means for operating said fluid pressure means, pneumatically actuated means rendered operative by the initial operation of said manually actuated means for assisting in the operation of the brakes, and a bell crank lever joining said pneumatically actuated means to said fluid pressure means, said lever being arranged with its weight arm normally substantially at right angles and its power arm at an acute angle to the axis of movement of said pneumatically actuated means, and with its power arm at substantially a right angle and its weight arm at an acute angle to said axis when said pneumatically actuated means is in its fully operated position.

12. In a braking apparatus, means for operating the brakes including a fluid pressure cylinder and a piston therein, manually actuated means for operating said piston, pneumatically actuated means rendered operative by the initial operation of said manually actuated means for assisting in the operation of said piston, and means joining said pneumatically actuated means to said piston whereby the force exerted on said piston by said pneumatically actuated means increases as the brakes approach their fully operated position.

13. In a braking apparatus, brake operating means including a fluid pressure cylinder and a piston therein, manually actuated means for operating said piston, pneumatically actuated means rendered operative by the initial operation of said manually actuated means for assisting in the operation of said piston, and a lever joining said pneumatically actuated means to said piston, said lever being so arranged that the relative length of its weight arm to its power arm decreases as the brakes approach their normal position.

14. In a braking apparatus, brake operating means including a fluid pressure cylinder and a piston therein, manually actuated means for operating said piston, pneumatically actuated means rendered operative by the operation of said manually actuated means for assisting in the operation of said piston, and power multiplying means joining said pneumatically actuated means to said piston.

15. In a braking apparatus, brake operating means including a fluid pressure cylinder and a piston therein, manually actuated means for operating said piston, pneumatically actuated means rendered operative by the initial operation of said manually actuated means for assisting in the operation of said piston, and a lever joining said pneumatically actuated means to said piston.

16. In a brake operating mechanism, brake operating means including a fluid pressure cylinder and a piston movable therein, manually actuated means for operating said piston, pneumatically actuated means rendered operative by the initial operation of said manually actuated means for assisting in the operation of said piston, and a bell crank lever joining said pneumatically actuated means to said piston, said lever being arranged with its weight arm normally substantially at right angles and its power arm at an acute angle to the axis of movement of said pneumatically actuated means, and with its power arm at substantially a right angle, and its weight arm at an acute angle to said axis when said pneumatically actuated means is in its fully operated position.

17. In a braking apparatus, brake operating means including a fluid pressure cylinder and a piston therein, manually actuated means for operating said piston, pneumatically actuated means including a cylinder and a piston therein for assisting in the operation of the brakes rendered operative by the initial operation of said manually actuated means, and power multiplying means joining said second mentioned piston to said first mentioned piston.

18. In a braking apparatus, brake operating means including a fluid pressure cylinder and a piston therein, manually actuated means for operating said piston, pneumatically actuated means including a cylinder and a piston therein for assisting in the operation of the brakes rendered operative by the initial operation of said manually actuated means, and lever mechanism joining said pistons.

19. In a braking apparatus, brake operating means including a fluid pressure cylinder and a piston therein, manually actuated means for operating said piston, pneumatically actuated means including a cylinder and a piston therein for assisting in the operation of the brakes rendered operative by the initial operation of said manually actuated means, and lever mechanism joining said second piston to said first piston, said mechanism being so arranged that the force exerted on said first piston by said second piston increases as the brakes approach their fully operated position.

20. In a braking apparatus, brake operating means including a fluid pressure cylinder and a piston therein, manually actuated means for operating said piston, pneumatically actuated means including a cylinder and a piston therein for assisting in the operation of the brakes rendered operative by the initial operation of said manually actuated means, and a lever joining said pistons, said lever being so arranged that the effective length of its weight arm relative to its power arm decreases as the brakes approach their set position.

21. In a braking apparatus, brake operating means including a fluid pressure cylinder and a piston therein, manually actuated means for operating said piston, pneumatically actuated means including a cylinder and a piston therein for assisting in the operation of the brakes rendered operative by the initial operation of said manually actuated means, and a bell crank lever joining said pistons, said lever being arranged with its weight arm normally substantially at right angles and its power arm at an acute angle to the axis of movement of said second mentioned piston and with its power arm at substantially a right angle and its weight arm at an acute angle to said axis when the brakes are in fully operated position.

In witness whereof, I hereunto subscribe my name this 15 day of July, 1922.

MALCOLM LOUGHEAD.

Witness:
DAGMAR PETERSON.